Sept. 30, 1969 A. J. BODNAR 3,470,384
PHOTOMETRIC GAUGE IN WHICH A TEST OBJECT IS ROTATED
ABOUT AN AXIS DISPOSED BETWEEN A LAMP MEANS
AND AN APERTURE MEANS
Filed Nov. 26, 1965 3 Sheets-Sheet 1

INVENTOR.
ALBERT J. BODNAR

INVENTOR.
ALBERT J. BODNAR

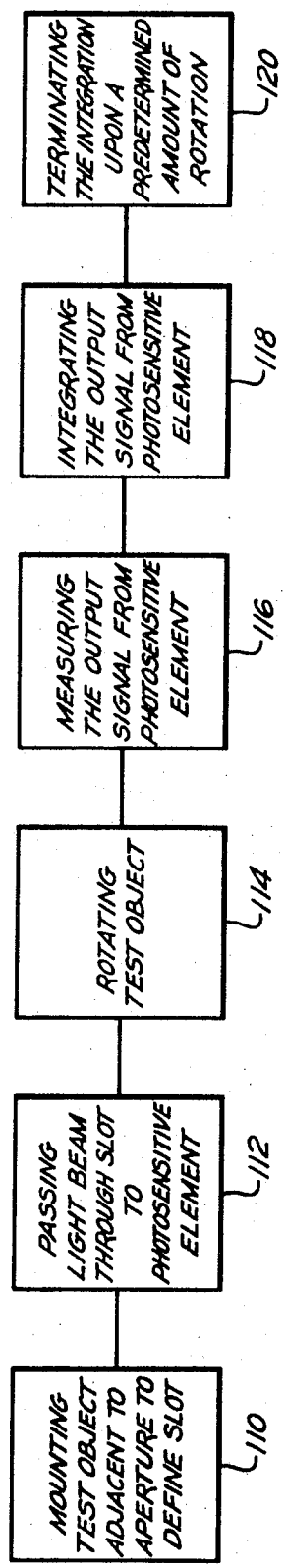

United States Patent Office 3,470,384
Patented Sept. 30, 1969

3,470,384
PHOTOMETRIC GAUGE IN WHICH A TEST OBJECT IS ROTATED ABOUT AN AXIS DISPOSED BETWEEN A LAMP MEANS AND AN APERTURE MEANS
Albert J. Bodnar, Penn Hills Township, Allegheny County, Pa., assignor to Gulf Research & Development Company, Pittsburgh, Pa., a corporation of Delaware
Filed Nov. 26, 1965, Ser. No. 509,705
Int. Cl. H01j *39/12*
U.S. Cl. 250—224
19 Claims

ABSTRACT OF THE DISCLOSURE

A photometric method and apparatus for gauging the total volume and distribution of a deposit adhering to the exterior curved surface of an object involving the rotation of the object on a plane transverse to a light beam and near an aperture for the passage of the light beam toward a photosensitive surface.

---

This invention relates to a photometric method and apparatus for gauging the total volume and distribution of deposits adhering to the exterior curved surface of an object which is rounded in transverse section such as, for example, a cone, cylinder, sphere, ellipsoid or paraboloid. In particular, this invention is directed toward a novel photometric determination of the volume and distribution of a coating of accumulated deposits around the fillet of the valve of an internal combustion engine.

The prior art discloses photometric apparatus wherein a beam of light is directed toward a photosensitive surface through an aperture disposed between the light source and the photosensitive surface. If deposits accumulate on the surface defining the aperture, a decreased amount of light will be received by the photosensitive surface and the decrease in the amount of light is a measure of the amount of deposits. However, if the perimeter of the aperture has a significant transverse thickness and the deposits are not of uniform depth along said transverse thickness, the decrease in quantity of light reaching the photosensitive surface does not provide an accurate indication of the total volume of deposits rimming the aperture. The reason is that when the aperture is rimmed by a layer of deposits which are of nonuniform thickness in a direction transverse to the aperture opening, the entire interruption in the light beam is accomplished by only the peaks in the nonuniform deposit layer and the photometric surface does not "know" whether a peak in the deposit layer which interrupts the light beam is relatively thick, extending the entire transverse thickness of the aperture, or is relatively thin and tapers to a much more shallow depth in a direction transverse to the aperture. Therefore in a deposit layer where there are random peaks and valleys, the peaks mask the presence of the valleys and an accurate indication of the total volume or weight of deposits cannot be obtained.

The present invention utilizes a photometric method and apparatus to determine the volume and distribution of a deposit layer adhering to the circumferential perimeter of a rounded object, wherein the deposit layer has sharp variations in topography and includes both peaks and depressions, valleys, or shallow areas in random distribution. In accordance with the photometric apparatus and method of the present invention, the peaks in a deposit layer do not mask the presence of the depressions.

The photometric apparatus of the present invention comprises an enclosed substantially lightproof chamber with an aperture on one wall of said chamber which constitutes substantially the only means for the admission of light to the interior thereof. A photoelectric element is disposed within the chamber on the wall opposite from said aperture. A light source such as a lamp is disposed outside of said chamber and the light source, aperture and photoelectric element are in aligned relationship for directing a beam of light through said aperture to the photoelectric element. Collimating lens means is provided for directing the rays of light in the light beam through the aperture to the photosensitive surface.

The test object is disposed closely adjacent to the aperture and is included in the aforementioned alignment of the lamp, the aperture and the photoelectric element. The deposit-laden curved surface of the test element obstructs a major portion but not all of the light transmitted through the aperture and only a narrow slot or slots on one or both sides of the curved surface, respectively, is defined for passage of light to the photoelectric surface. The aperture is slightly larger than the outlines of the deposit-laden surface of the test element it frames. The aperture preferably possesses the general shape or contour of the test element surface framed by it. However, the aperture can have a contour other than the contour of the test object which it frames.

The test element is mounted on rotating means for in situ rotation of said element on its axis. The narrow slots on the sides of the deposit-coated curved surface of the rotating test element are defined in part by the periphery of the stationary aperture and in part by a continuously changing row of peaks and valleys on the surface of the deposit layer coating the test object. At a constant rotational speed each peak and valley in the deposit layer will obstruct transmission of light to an extent and for a time interval determined by its own dimensions. The photoelectric element discharges a variable output signal such as an electric current which at a given instant is proportional to the instantaneous amount of light it receives which is in turn proportional to the instantaneous size of said slots. This electric current is transmitted to measuring and integrating means which measures and integrates the current received, the total current being an indication of the total volume of deposits on the test element.

Where the aperture frames two slots, one on either side of the test element, the integral obtained during only one-half revolution of the test element is substantially proportional to the total volume of the deposit coating around the entire circumference of the test element. An automatic limit switch is utilized to automatically concomitantly energize the integrator means and the motor which rotates the test element and then concomitantly deenergize said integrator and motor upon a predetermined amount of rotation of the test element so that the integrated value corresponds with a predetermined amount of rotation of the test element.

This invention will be more completely understood by reference to the accompanying drawings in which:

FIGURE 5 is a flow sheet which illustrates the process steps of this invention.

Figures 1, 3:
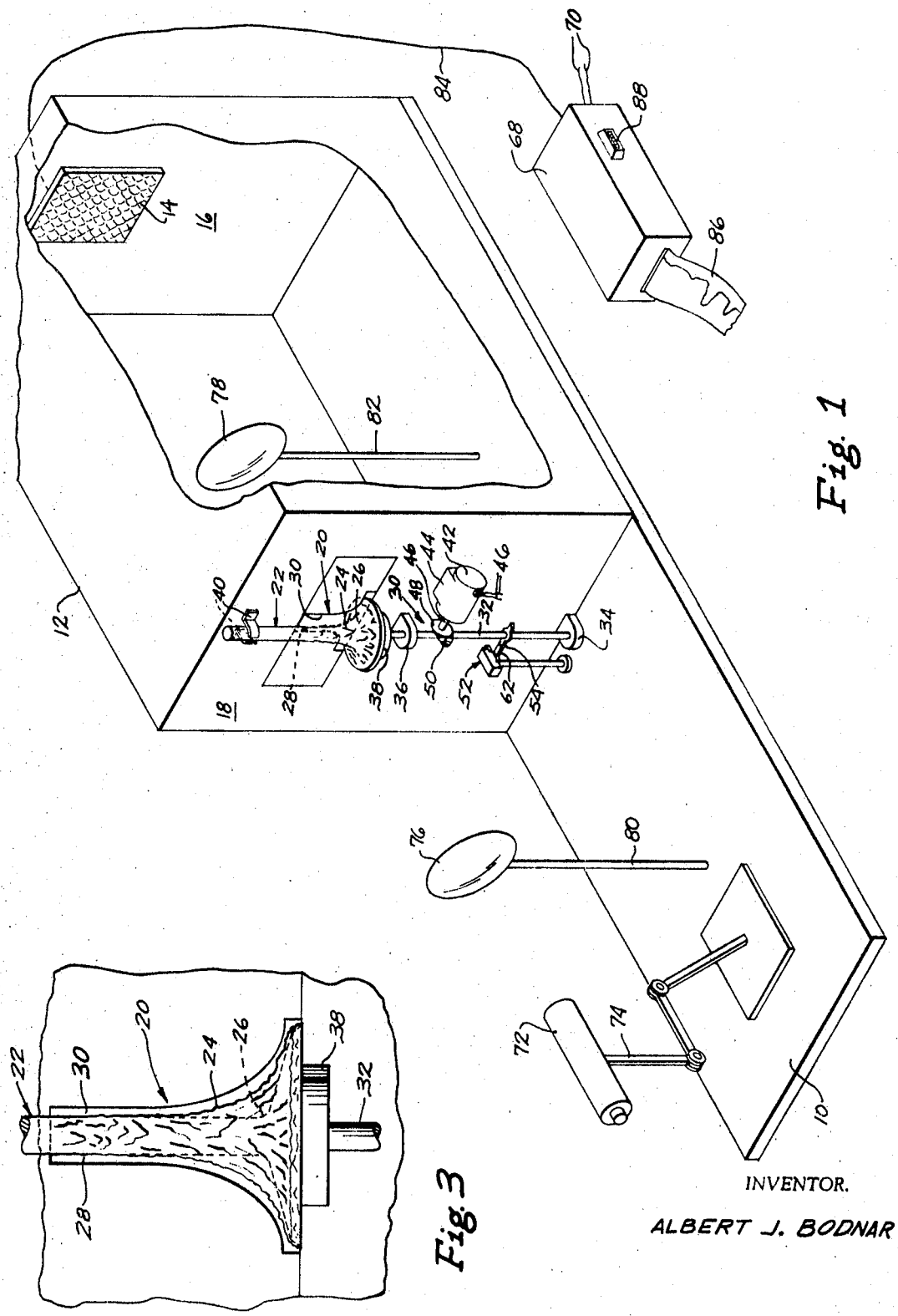
FIGURE 1 is an isometric view of a complete apparatus of this invention.
FIGURE 3 is a fragment of the apparatus of FIGURE 1.

As shown in FIGURE 1, the entire appparatus is supported upon a base 10. An enclosed chamber or box 12, which is preferably light-proof, is secured to base 10 at one end thereof. Photoelectric surface element 14 which emits an electric current proportional to the amount of light it receives is secured to end wall 16 of chamber 12 while opposite end wall 18 is provided with aperture 20.

Aperture 20 has the general contour of internal combustion engine valve 22 which has a solid deposit formation 24 of rough and uneven surface relief adhering thereto around the circumference thereof. Deposite formation 24 is thickest in the region of fillet 26, which is indicated by the dashed lines in FIGURE 3. Aperture 20 is slightly larger than the widest outlines of deposits 24 to define narrow, generally equal-sized slots 28 and 30 on either side of the valve 22, as indicated most clearly in FIGURE 3, for the passage of light to photoelectric surface 14. Slots 28 and 30 are substantially the only means for admitting light into otherwise dark chamber 12.

Valve 22 is supported upon a rotatable pedestal assembly 30. Assembly 30 comprises a rotating vertical shaft 32 supported upon bearing 34 which is secured to base 10. As shown in FIGURE 1, shaft 32 has an axis which is transverse with respect to the path of light and the axis is on a plane between aperture 20 and lamp 72. Shaft 32 is supported near its upper end by means of a second bearing 36 and the upper end of the shaft supports a magnetic table 38. The head of valve 22 rests upon magnetic table 38 and the valve is squarely aligned with respect to aperture 20 with the assistance of guide brackets 40 which are free of contact with valve 22.

Assembly 30 is rotated by means of a synchronous motor 42 which is mounted upon wall 18 by means of support 44 and is supplied with power through leads 46. Motor 42 drives shaft 46 to which is attached bevel gear 48. Bevel gear 48 meshes with companion bevel gear 50 carried by shaft 32 so that rotation of motor 42 causes rotation of magnetic table 38 and valve 22 mounted thereon.

Figure 2:
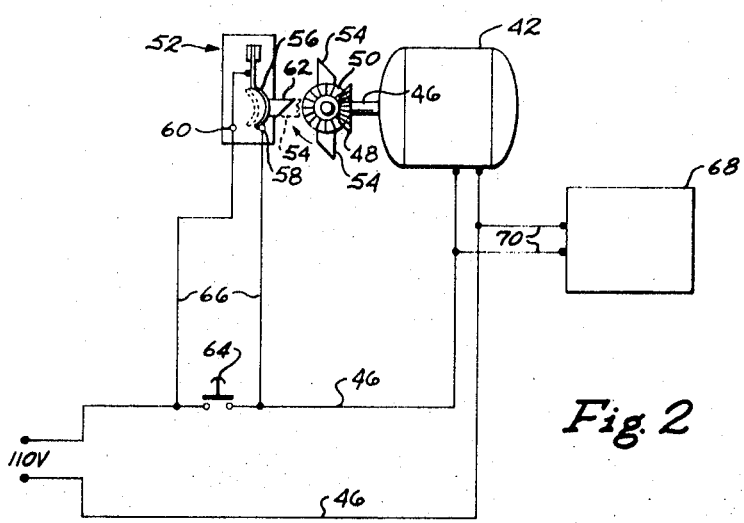
FIGURE 2 is a diagram of the electrical circuit controlled by the limit switch of the apparatus of FIGURE 1.

Limit switch 52, shown in both FIGURE 1 and FIGURE 2, governs the sequence of operation of motor 42. Cam or circuit breaker 54 having opposing beveled ends is fixedly secured to shaft 32 and rotates therewith. Prior to commencement of operation of the apparatus of FIGURE 1, cam 54 and limit switch 52 are in contact so that limit switch 52 is maintained in an open position, as indicated by the dashed lines in FIGURE 2. Limit switch 52 contains a leaf spring 56 which is normally in contact with terminal 58 to close the circuit across terminals 58 and 60. Attached to spring 56 is pin 62 having a beveled end so that when pin 62 is in contact with cam 54, the circuit across terminals 58 and 60 is open.

The apparatus is started by manually depressing normally open spring-loaded toggle switch 64 to supply power to synchronous, low speed motor 42 through wires 46. Motor 42 can operate at any constant rotational speed. One end of cam 54 initially abuts squarely against pin 62 so that limit switch 52 is initially open and toggle switch 64 is maintained in a depressed condition until cam 54 rotates clockwise out of contact with pin 62. Thereupon, leaf spring 56 contacts terminal 58 and the circuit to motor 42 is completed through limit switch 52, permitting release of toggle switch 64 to its normally open position. While power is being supplied to motor 42 it is also being supplied to recorder-integrator 68 through wires 70 whereby energization of motor 42 and recorder-integrator 68 occurs concomitantly and deenergization of motor 42 and recorder-integrator 68 also occurs concomitantly. After shaft 32 rotates one-half revolution, the opposite end of cam 54, rotating clockwise, comes into abutting contact with pin 62 causing the circuit to open, terminating the supply of power to motor 42 and recorder-integrator 68 whereby rotation of motor 42 and operation of recorder-integrator 68 terminates concomitantly to complete the test cycle.

During the rotation cycle, a beam of light from lamp 72 is directed through slots 28 and 30. Lamp 72 is provided with adjusting means 74 for directing its beam toward aperture 20. A pair of collimating lenses 76 and 78, held by supports 80 and 82, respectively, projects a beam of parallel light rays from light source 72 through slots 28 and 30 to photoelectric surface 14. The amount of light passing through slots 28 and 30 and reaching photosensitive surface 14 is determined by the total obstruction to light passage through aperture 20 presented by the deposit-laden surface of valve 22.

During rotation of valve 22 for one-half cycle, the deposits on the half of the circumferential periphery of the valve initially facing away from lamp 72 and into chamber 12 continually change the contour of slot 30 while, during the same interval, the deposits on the half of the circumferential periphery of the valve initially facing toward lamp 72 continually change the contour of slot 28. After one-half cycle, all the deposits around the entire circumference of valve 22 have affected passage of light through either slot 28 or slot 30. During this period, the light reaching photoelectric surface 14 through the continually changing contours of slots 28 and 30 energizes photoelectric surface 14 causing an electric current to be generated which is proportional to the quantity of light reaching it from slots 28 and 30. The electric current is transmitted to recorder-integrator 68 through wire 84. Recorder-integrator 68 produces a chart 86 which shows the amount of deposits at any particular vertical plane taken through the axis of valve 22. The total quantity of deposits is indicated at integrator 88, which automatically measures the area under the curve on chart 86.

Figure 4:
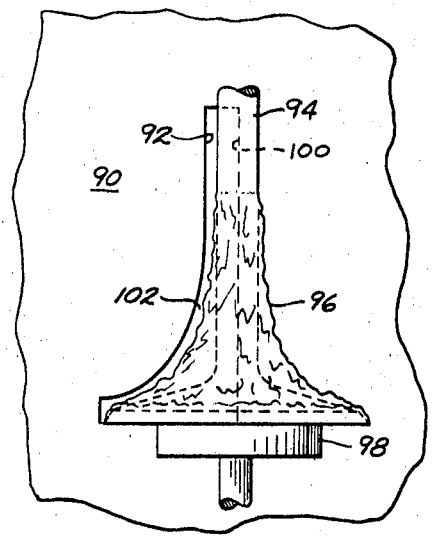
FIGURE 4 is a modification of the fragment shown in FIGURE 3.

Any point on indicator chart 86 produced by the apparatus of FIGURE 1 provides an indication of deposit formation along two vertical lines 180 degrees apart on the curved surface of a test element. FIGURE 4 shows a segment of a modification of the apparatus which provides an indication of deposit formation along a single vertical line on a test object. Referring to FIGURE 4, wall 90 of a dark, enclosed chamber is provided with aperture 92. Aperture 92 frames only one side of test valve 94 containing an uneven layer of solid deposits 96. Valve 94 is mounted on rotatable table 98. As indicated by the dashed line 100 which defines the periphery of aperture 92, the aperture permits deposit layer 96 to define only a single slot 102 through which a light beam can pass, no corresponding slot being provided on the opposite side of the test element. As shown in FIGURE 4, slot 102 is defined only by test valve 94 and aperture 92 but not table 98. In the embodiment of FIGURE 4, the test element must be rotated a fully revolution, rather than a half revolution, to obtain an integration of total deposit formation along an entire circumferential section thereof. Therefore, if the electrical system shown in FIGURE 2 were to be utilized with the embodiment of FIGURE 4, cam 54 would be modified to project from only one rather than two sides of bevel gear 50 whereby cam 54 and pin 62 would make contact only once every full revolution.

The apparatus of this invention is calibrated by obtaining a reference measurement with a test valve or other test object which is free of deposits. Also, to obtain an integration of very high accuracy the total number of revolutions of the test object during an integration can be increased by a factor which is two or more times greater than the minimum required to obtain an integration along one entire circumferential segment followed by division of the result obtain by that factor.

The above description of this invention in terms of process is illustrated by self-explanatory steps 110, 112, 114, 116, 118 and 120 of FIGURE 5.

Various changes and modifications can be made without departing from the spirit of this invention or the scope thereof as defined in the following claims:

I claim:
1. An apparatus comprising lamp means, aperture means, and photosensitive means in aligned relationship for directing a beam of light from said lamp means through said aperture means to said photosensitive means, rotatable mounting means for mounting a test object adjacent to said aperture means and in said aligned relation- ship for defining slot means outlined only by said aperture means and the surface of said test object but not said mounting means which slot means is substantially the only path for light from said lamp means to said photosensitive means, said rotable mounting means adapted to rotate the test object on an axis which is transverse to said light path and disposed between said lamp means and said aperture means, said photosensitive means producing an output signal in response to the quantity of light transmitted from said lamp means through said slot means and corresponding to the size of said slot means.

2. The apparatus of claim 1 including means for rotating said rotatable mounting means.

3. The apparatus of claim 1 wherein said photosensitive means is a photoelectric means.

4. The apparatus of claim 1 including means for measuring said output signal from said photosensitive means.

5. The apparatus of claim 1 including means for integrating said output signal from said photosensitive means.

6. The apparatus of claim 1 including enclosed chamber means having said aperture means and said photosensitive means disposed in opposite walls thereof.

7. The apparatus of claim 1 including switch means actuated upon rotation of said rotatable means.

8. The apparatus of claim 1 wherein rotation of said test object causes said slot means to have a continually changing outline.

9. The apparatus of claim 1 wherein said aperture means has generally the same contour as and is larger than the contour of said test object.

10. The apparatus of claim 1 wherein only one slot means is defined by said test object.

11. The apparatus of claim 1 wherein two slot means are defined by said test object.

12. The apparatus of claim 1 including collimating lenses for directing the rays of light from said lamp means through said aperture means to said photosensitive means.

13. An apparatus for measuring and integrating the quantity of material in an uneven surface coating of solid deposits adhering to a circumferential perimeter of rounded test object comprising enclosed chamber means, aperture means at one end of said chamber means which is substantially the only means for the admission of light to the interior of said chamber means, photoelectric means on the other end of said chamber means, lamp means outside of said chamber means, said lamp means, said aperture means and said photoelectric means in aligned relationship for directing a beam of light from said lamp means through said aperture means to said photoelectric means, rotatable mounting means for mounting said test object adjacent to said aperture means and in said aligned relationship to define slot means for the passage of light outlined by said aperture means and the surface of said test object so that rotation of the uneven surface coating of said test object provides substantially a continually changing contour defining said slot means, motor means for rotating said rotatable mounting means, said photoelectric means producing a variable electric current output signal which at a given instant is substantially proportional to the instantaneous size of said slot means, measuring means for measuring said output signal, integrating means for integrating said output signal, switch means actuated by said rotatable means for energizing said motor means and said integrating means concomitantly and then automatically deenergizing said motor means and said integrating means concomitantly upon a predetermined rotation of said rotatable means.

14. A process for determining the quantity of material in an uneven surface coating of solid deposits adhering to a circumferential perimeter of a rounded test object comprising mounting said test object adjacent to aperture means to define slot means outlined only by said aperture means and the surface of said test object, passing a beam of light through said slot means to a photosensitive element which produces a signal proportional to the quantity of light passed through said slot means, rotating said test object on an axis which is transverse to the light path and disposed between the light source and the aperture means whereby the uneven surface coating on said test object can provide a substantially continually changing contour outlining said slot means, said photosensitive means producing a variable output signal substantially proportional to the instantaneous size of said slot means.

15. The process of claim 14 including the step of measuring said variable output signal.

16. The process of claim 15 including the step of integrating said output signal.

17. The process of claim 16 including the step of automatically terminating said integrating step upon a predetermined amount of rotation of said test object.

18. An apparatus comprising lamp means, aperture means, and photosensitive means in aligned relationship for directing a beam of light from said lamp means through said aperture means to said photosensitive means, rotatable mounting means for mounting a test object adjacent to said aperture means and in said aligned relationship for defining slot means outlined by said aperture means and the surface of said test object which is substantially the only path for light from said lamp means to said photosensitive means, said photosensitive means producing an output signal in response to the quantity of light transmitted from said lamp means through said slot means and corresponding to the size of said slot means, means for integrating said output signal from said photosensitive means and switch means actuated upon rotation of said rotatable means for initiating and interrupting operation of said integrating means.

19. An apparatus comprising lamp means, aperture means, and photosensitive means in aligned relationship for directing a beam of light from said lamp means through said aperture means to said photosensitive means, rotatable mounting means for mounting a test object adjacent to said aperture means and in said aligned relationship for defining slot means outlined by said aperture means and the surface of said test object which is substantially the only path for light from said lamp means to said photosensitive means, said photosensitive means producing an output signal in response to the quantity of light transmitted from said lamp means through said slot means and corresponding to the size of said slot means, motor means for rotating said rotatable means, integrating means for integrating said output signal, and switch means actuated upon rotation of said rotatable means for initiating operation of said motor means and said integrating means concomitantly and for interrupting operation of said motor means and said integrating means concomitantly.

References Cited

UNITED STATES PATENTS

| 2,433,558 | 12/1947 | Hurley | 250—224 X |
| 2,441,343 | 5/1948 | Becker | 250—224 X |
| 2,487,629 | 11/1949 | Aller et al. | 250—224 X |
| 2,895,373 | 7/1959 | Eyraud | 250—224 X |
| 2,958,254 | 11/1960 | Kittelberger et al. | 250—224 X |
| 3,245,308 | 4/1966 | Igoe et al. | 88—14 |

RALPH G. NILSON, Primary Examiner

T. N. GRIGSBY, Assistant Examiner

U.S. Cl. X.R.

250—237; 356—157, 168